Feb. 21, 1928.
J. L. PRICE
BRAKE SHOE
Filed May 7, 1925
1,660,135
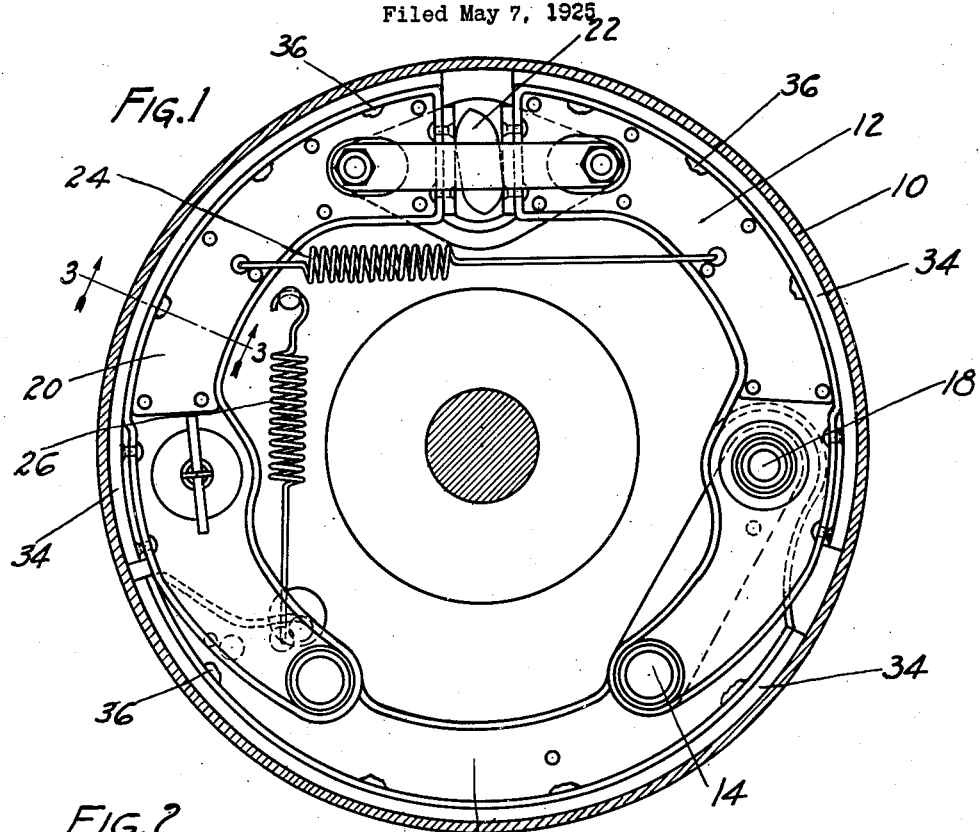

Patented Feb. 21, 1928.

1,660,135

UNITED STATES PATENT OFFICE.

JACOB L. PRICE, OF CHICAGO, ILLINOIS, ASSIGNOR TO BENDIX BRAKE COMPANY, OF CHICAGO, ILLINOIS, A CORPORATION OF ILLINOIS.

BRAKE SHOE.

Application filed May 7, 1925. Serial No. 28,555.

This invention relates to brakes, and is illustrated as embodied in a shoe for an internal expanding brake. An object of the invention is to provide inexpensive means for providing a tight bond between the brake lining and the metal brake shoe, by pressing the lining while plastic against the shoe, or equivalent, to rivet itself through openings therein. That is, the lining material flows through the openings under pressure to rivet itself to the metal.

This and other objects and features of the invention will be apparent from the following description of one illustrative embodiment shown in the accompanying drawings, in which:

Figure 1 is a vertical section through a brake, just inside the wheel, showing the shoe in side elevation;

Figure 2 is an elevation of one shoe, before the lining is applied; and

Figure 3 is a section through the finished shoe.

In the arrangement selected for illustration, the invention is embodied in a brake including a drum 10, a rear shoe 12 anchored at 14 within the drum, a forward shoe 16, a servo shoe 20 pivotally anchored at 18, and a servo shoe 20 pivotally connected to the forward shoe 16. The shoes 12 and 20 are expanded in applying the brake by a cam 22 against the resistance of a spring 24, and servo shoe 20 is then moved slightly circumferentially to apply the forward shoe 16 against the resistance of an auxiliary spring 26.

The illustrated shoes are of T section, built up of two pressed metal parts generally channel-shaped in cross section and secured back to back to form a radial web 28 and lining-supporting flanges 30 formed with openings 32.

According to the present invention, the brake lining 34 is forced while plastic against the flanges 30, and flows through the openings 32 under pressure, riveting itself firmly to the metal at 36 to form a very tight bond, giving a molded lining formed right in place on the shoe, and which need not be removed from the press for riveting or other finishing operations which tend to disturb the exact fit of the lining and metal.

While one illustrative embodiment has been described in detail, it is not my intention to limit the scope of the invention to that particular embodiment, or otherwise than by the terms of the appended claims.

I claim:

1. A brake shoe having a cylindrical part and a stiffening web therefor, the cylindrical part having openings on opposite sides of the web, in combination with a sheet of brake lining on and supported by the cylindrical part and extruded at a plurality of points through said openings and spread out on the opposite face of the cylindrical part to form, in effect, rivet heads integral with the lining.

2. A brake shoe having a cylindrical part formed with openings, in combination with brake lining on the cylindrical part extruded through said openings and spread out on the opposite face thereof to form, in effect, rivet heads integral with the lining, and which lining is backed up in a supporting manner by said part between the openings.

3. A friction element for a brake comprising a perforated curved metal member which is substantially rigid, and a sheet of friction material overlying and centrally supported by one face of said member and having a series of relatively small integral portions extruded through the perforated parts of said member and securing the friction material thereto.

4. A friction shoe for a brake, generally T-shaped in cross-section, and comprising a perforated curved metal member which is substantially rigid and part of which forms the stiffening web of the shoe, in combination with a cylindrical sheet of friction material forming the outer face of the shoe and which is supported by the perforated member and which has integral portions extending through the perforated parts of said member in such a manner as to secure the friction material thereto.

In testimony whereof I have hereunto signed my name.

JACOB L. PRICE.